United States Patent
Oh et al.

(10) Patent No.: US 10,914,426 B2
(45) Date of Patent: Feb. 9, 2021

(54) LNG FUELING STATION AND LNG FUELING METHOD USING LNG TANK CONTAINER

(71) Applicant: Korea Gas Corporation, Seongnam-si (KR)

(72) Inventors: Young Sam Oh, Incheon (KR); Ki-Dong Kim, Incheon (KR); Kyoung-Shik Choi, Ansan-si (KR); Seong Ho Hong, Gwacheon-si (KR)

(73) Assignee: Korea Gas Corporation, Seongnam-si (KR)

( * ) Notice: Subject to any disclaimer, the term of this patent is extended or adjusted under 35 U.S.C. 154(b) by 130 days.

(21) Appl. No.: 14/905,235

(22) PCT Filed: Nov. 28, 2013

(86) PCT No.: PCT/KR2013/010891
§ 371 (c)(1),
(2) Date: Jan. 14, 2016

(87) PCT Pub. No.: WO2015/012445
PCT Pub. Date: Jan. 29, 2015

(65) Prior Publication Data
US 2016/0178127 A1 Jun. 23, 2016

(30) Foreign Application Priority Data

Jul. 24, 2013 (KR) .................. 10-2013-0087391

(51) Int. Cl.
*F17C 13/08* (2006.01)
*B60S 5/02* (2006.01)
(Continued)

(52) U.S. Cl.
CPC .............. *F17C 13/083* (2013.01); *B60S 5/02* (2013.01); *B65G 63/025* (2013.01); *F17C 3/00* (2013.01);
(Continued)

(58) Field of Classification Search
CPC ...... F17C 2270/0171; F17C 2270/0134; F17C 2270/0136; F17C 2270/0139; F17C 6/00;
(Continued)

(56) References Cited

U.S. PATENT DOCUMENTS 4,172,685 A * 10/1979 Nabeshinna ............ B66C 13/46
212/276
5,421,160 A * 6/1995 Gustafson ............... F17C 5/007
123/525

(Continued)

FOREIGN PATENT DOCUMENTS

| CN | 1263505 A | 8/2000 |
|---|---|---|
| CN | 201419424 Y | 3/2010 |

(Continued)

OTHER PUBLICATIONS

Supplementary European Search Report for European Patent Application No. 13890034.5.
(Continued)

*Primary Examiner* — Andrew D Stclair
(74) *Attorney, Agent, or Firm* — Brinks Gilson & Lione

(57) ABSTRACT

An LNG fueling station according to the present invention includes: an installation part on which an LNG tank container is installed, and a supply part for supplying liquefied natural gas from the LNG tank container installed on the installation part to an object for supply, wherein the LNG tank container can be transported and installed while storing (Continued)

the liquefied natural gas, and the LNG tank container is transported to the installation part and then installed on the installation part.

10 Claims, 11 Drawing Sheets

(51) Int. Cl.
| | |
|---|---|
| B65G 63/02 | (2006.01) |
| F17C 3/00 | (2006.01) |
| F17C 7/02 | (2006.01) |
| F17C 7/04 | (2006.01) |
| F17C 5/02 | (2006.01) |
| F17C 6/00 | (2006.01) |

(52) U.S. Cl.
CPC ............... *F17C 5/02* (2013.01); *F17C 7/02* (2013.01); *F17C 7/04* (2013.01); F17C 6/00 (2013.01); F17C 2201/0119 (2013.01); F17C 2201/035 (2013.01); F17C 2201/054 (2013.01); F17C 2205/0107 (2013.01); F17C 2205/0126 (2013.01); F17C 2205/0142 (2013.01); F17C 2205/0157 (2013.01); F17C 2205/0169 (2013.01); F17C 2205/0192 (2013.01); F17C 2221/033 (2013.01); F17C 2223/0153 (2013.01); F17C 2223/0161 (2013.01); F17C 2223/033 (2013.01); F17C 2227/0135 (2013.01); F17C 2227/0157 (2013.01); F17C 2227/0393 (2013.01); F17C 2265/061 (2013.01); F17C 2265/063 (2013.01); F17C 2270/0105 (2013.01); F17C 2270/0171 (2013.01)

(58) Field of Classification Search
CPC .... F17C 13/083; F17C 13/123; B65D 88/121; B61D 5/06; B61D 5/008
See application file for complete search history.

(56) References Cited

U.S. PATENT DOCUMENTS

| | | | |
|---|---|---|---|
| 5,860,783 A | 1/1999 | Corcoran | |
| 5,951,226 A * | 9/1999 | Fantuzzi | B66C 19/002 212/316 |
| 5,975,371 A * | 11/1999 | Webb | B60S 5/02 137/376 |
| 6,640,554 B2 * | 11/2003 | Emmer | F17C 5/007 220/560.1 |
| 6,899,146 B2 * | 5/2005 | Bingham | F17C 7/02 141/11 |
| 2005/0173364 A1 * | 8/2005 | Spohler | B66C 13/48 212/270 |
| 2009/0115190 A1 * | 5/2009 | Devine | F17C 3/025 290/44 |
| 2010/0018603 A1 * | 1/2010 | Adler | F17C 5/06 141/4 |
| 2010/0303594 A1 * | 12/2010 | Duell | B60P 1/6463 414/479 |
| 2012/0298935 A1 * | 11/2012 | Ross | B60P 1/6445 254/2 R |
| 2013/0139719 A1 * | 6/2013 | Kun | B61D 3/184 105/355 |

FOREIGN PATENT DOCUMENTS

| | | |
|---|---|---|
| CN | 103003141 A | 3/2013 |
| CN | 202812781 U | 3/2013 |
| CN | 105164463 A | 12/2015 |
| EP | 2985508 A1 | 2/2016 |
| JP | H08337390 A | 12/1996 |
| JP | H11165580 A | 6/1999 |
| KR | 1020030082489 A | 10/2003 |
| KR | 101037262 B1 | 5/2011 |
| KR | 1020120084105 A | 7/2012 |
| WO | WO 03/091620 A1 | 11/2003 |

OTHER PUBLICATIONS

International Search Report issued in PCT/KR2013/010891, dated Apr. 24, 2014, pp. 1-5.
Office Action dated Dec. 11, 2018 for Chinese Application No. 201710769187.5, 8 pages.
Office Action dated Feb. 3, 2020 for Chinese Application No. 201710769187.5, 8 pages.
Examination Report dated Dec. 10, 2019 for European Application No. 13890034.5, 5 pages.

* cited by examiner

LNG FUELING STATION AND LNG FUELING METHOD USING LNG TANK CONTAINER

CROSS-REFERENCE TO RELATED APPLICATIONS

This application a National Stage of International Application PCT/KR2013/010891 filed on Nov. 28, 2013, which claims the benefit of filing dates of Korean Patent Application No. 10-2013-0087391 filed on Jul. 24, 2013. The entirety of all applications is hereby incorporated by reference.

TECHNICAL FIELD

The present invention relates to a liquefied natural gas (LNG) fueling station and an LNG fueling method, and more particularly, to an LNG fueling station and an LNG fueling method capable of supplying liquefied natural gas more conveniently and safely to a remote place.

BACKGROUND

In general, there are two typical methods for supplying natural gas to consumers, as follows. In the first method, natural gas is directly supplied to consumers through a piping network, and in the second method, liquefied natural gas (LNG) is supplied to consumers through a tank lorry. In relation to this, as LNG vehicles or LNG fuel ships have been developed, the supply of LNG has also been drawing much attention. So far, the second method using a tank lorry is generally employed to supply LNG.

However, the second method has several problems that will be described below in detail. First, in the second method, a fixed storage tank should be separately installed at a remote place in order to store and supply LNG. However, the installation of the fixed storage tank is very costly. Also, it is difficult, with the fixed storage tank, to effectively respond to the cases in which LNG is temporarily required to be supplied, or more LNG is required to be supplied. Further, when the fixed storage tank is filled with liquefied natural gas, there is a risk of fire. In addition, in order to supply LNG to an LNG vehicle or LNG fuel ship, a fueling apparatus should be installed separately, which causes the same problem arising during installation of the fixed storage tank.

SUMMARY

In order to address the foregoing problems, the present invention provides an LNG fueling station and an LNG fueling method, which are capable of supplying liquefied natural gas to a remote place more conveniently and safely.

An LNG fueling station according to the present invention includes an installation part on which an LNG tank container is installed, and a supply part for supplying liquefied natural gas from the LNG tank container installed on the installation part to an object for supply. The LNG tank container can be transported and installed while storing the liquefied natural gas, and the LNG tank container is transported to the installation part and then installed on the installation part.

Also, an LNG fueling method according to the present invention includes transporting an LNG tank container to an installation part, on which the LNG container is installed, through a transporting means, unloading the LNG tank container from the transporting means to the installation part and installing on the installation part, and supplying liquefied natural gas to an object for supply from the LNG tank container installed on the installation part.

An LNG fueling station and an LNG fueling method according to the present invention have effects in that liquefied natural gas can be directly supplied to a remote consumer in more convenient and safe way by only transporting an LNG tank container to an installation part and installing on the installation part.

DETAILED DESCRIPTION

Preferred embodiments of the present invention will be described below in more detail with reference to the accompanying drawings. However, it is to be understood that the invention is not limited to the embodiments described below.

EXAMPLE 1

Figure 1:
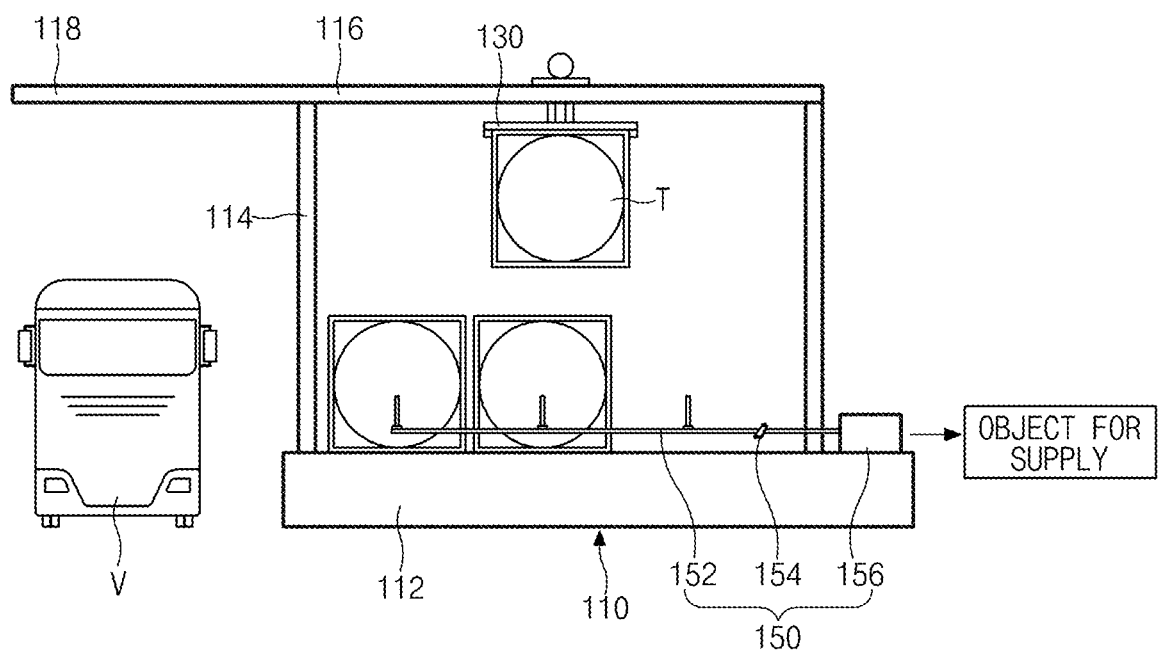
FIG. 1 is a front view illustrating an LNG fueling station according to example 1 of the present invention.
Figure 2:
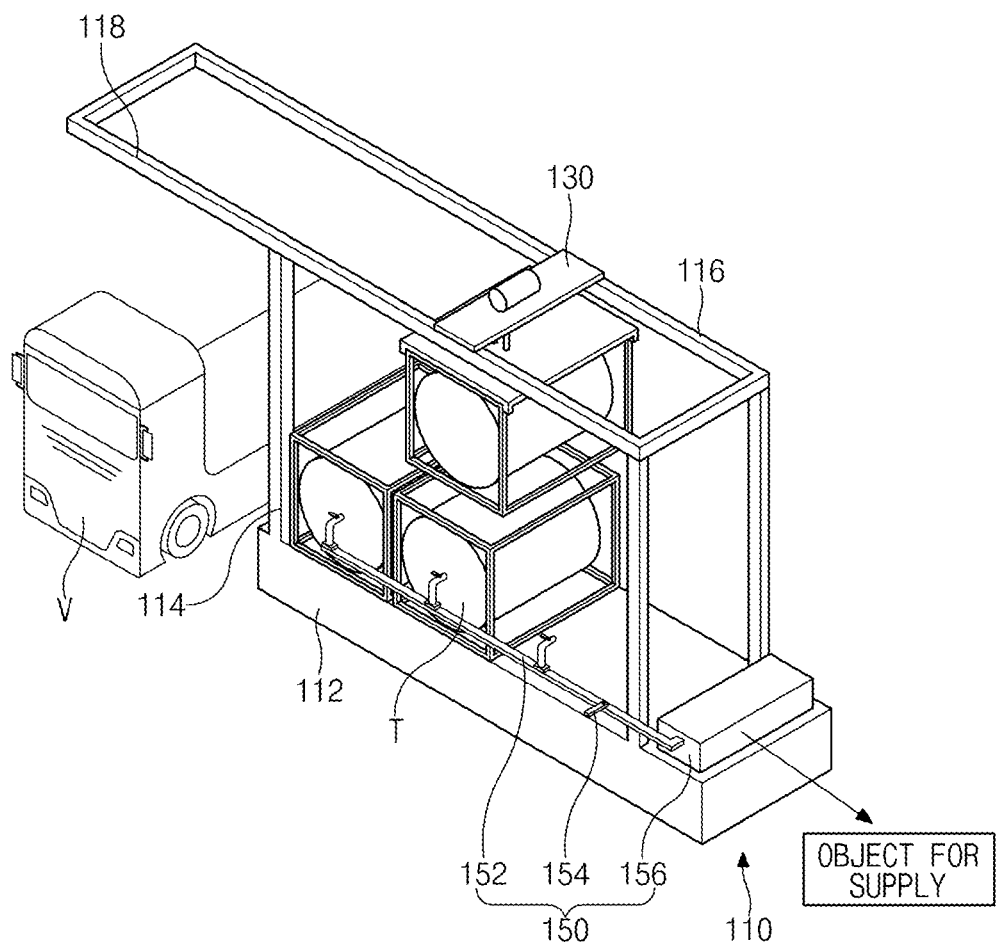
FIG. 2 is a perspective view illustrating the LNG fueling station of FIG. 1.

FIG. 1 is a front view illustrating an LNG fueling station according to example 1 of the present invention, and FIG. 2 is a perspective view illustrating the LNG fueling station of FIG. 1. As illustrated in FIGS. 1 and 2, the LNG fueling station according to example 1 of the present invention basically includes an installation part 110 and a supply part 150.

First, the installation part 110 will be described. The installation part 110 means a structure which is installed on the ground and on which an LNG tank container T transported thereto is mounted. That is, the LNG tank container T is transported to the installation part 110 and then installed on the installation part 110. After installed on the installation part 110 as such, the LNG tank container supplies liquefied natural gas to an LNG fuel ship or an LNG vehicle (through a supply part to be described later) while being installed on the installation part 110.

Since this installation part 110 is sufficient to simply mount the LNG tank container T to install the LNG tank container T, the structure thereof is very simple. Thus, the installation part 110 may be installed at a required place with a lower cost, and may be not only easily removed after installation but also easily re-installed at another place.

For reference, in order to install the LNG tank container T on the installation part 110, the LNG tank container T may be simply unloaded onto the installation part 110. That is, after being transported to the installation part 110 through a transporting means V, such as a trailer truck, the LNG tank container T may be simply unloaded onto the installation part 110.

After being transported to the installation part 110 through the transporting means V, the LNG tank container T may be carried to the installation part 110 through a crane part 130. The crane part 130 lifts and carries the LNG tank container T to the installation part 110. As such, the LNG tank container T may be carried to the installation part 110 through the crane part 130 to be installed on the installation part 110.

This crane part 130 may be installed on the installation part 110. For this, the installation part 110 may be provided with a base 112 which is installed on the ground to mount the LNG tank container T, a vertical frame 114 vertically installed from the base 112, and a horizontal frame 116 horizontally installed while being supported by the vertical frame 114. Here, the crane part 130 may be installed on the horizontal frame 116 of the installation part 110 to be moved along the horizontal frame 116.

It is preferable that the horizontal frame 116 extends longer to the outside than the base 112 as illustrated in FIG. 1. That is, the horizontal frame 116 preferably includes an extension portion 118 extending longer to the outside than the base 112. This is because, when the horizontal frame 116 includes the extension part 118, the crane part 130 may move to the outside of the base 112 along the extension part 118 of the horizontal frame 116 and easily carry the LNG tank container T, which is transported to a place under the extension portion 118, to the installation part 110.

For reference, in this example, the supply capacity of liquefied natural gas may be adjusted through the number of LNG tank containers T installed on the installation part 110. For example, when several LNG tank containers T are mounted in a horizontal direction on the base 112, or the LNG tank containers T are repeatedly stacked thereon, the supply capacity of the liquefied natural gas may be increased. As such, the installation of the LNG tank containers T in the horizontal or vertical directions may be accomplished through the crane part 130. When several LNG tank containers T are installed as the above, the respective LNG tank containers T may be connected to each other through a pipe 152.

Next, the supply part 150 will be described. The supply part 150 means a structure which supplies the liquefied natural gas from the LNG tank container T installed on the installation part 110 to an object for supply. Here, the object for supply means an object to which the liquefied natural gas is supplied. For example, the object for supply may be an LNG fuel ship or an LNG vehicle which uses the liquefied natural gas as a fuel.

More specifically, the supply part 150 may basically include a main pipe 152 connected to the LNG tank containers T. The liquefied natural gas in LNG tank containers T may be supplied to the object for supply through the main pipe 152. This main pipe 152 may be branched into a plurality of pipes as illustrated in FIGS. 1 and 2.

Also, the supply part 150 may further include a main valve 154 which is provided in the main pipe 152 to open/close the main pipe 152. Also, the supply part 150 may further include a fueling part 156 which is connected to the main pipe 152 to fuel the liquefied natural gas to the object for supply. Here, the fueling part 156 may include a LNG pump (not shown) for a pressurized transfer of the liquefied natural gas, and a flow meter (not shown) for measuring the amount of the liquefied natural gas. However, when the liquefied natural gas is supplied by using a pressure difference, the LNG pump may not be required.

This supply part 150 may be integrally provided with the installation part 110. When the supply part is integrally provided as the above, all the components for supplying the liquefied natural gas may be installed at a consumer place by only installing the installation part 110. Accordingly, the fueling system may not only be easily installed at a consumer place through the installation of the installation part 110, but also easily removed from the consumer place through a removal of the installation part 110 in the case in which the fueling system is not required any more.

Also, the supply part 150 may further include a vaporizer (not shown) which receives liquefied natural gas from the LNG tank containers T and vaporize the liquefied gas to generate natural gas, and a compressor (not shown) which receives the natural gas from the vaporizer, and compresses the natural gas to generate compressed natural gas (CNG). In this case, the supply part 150 may supply the compressed natural gas to the object for supply. Here, the object for supply may be a CNG vehicle using the compressed natural gas as a fuel.

For reference, the supply part 150 may have a pipeline for supplying liquefied natural gas and a pipeline for supplying compressed natural gas, which are separately installed. That is, the main pipe 152 is branched into two portions, in which one portion may be used as a line for supplying liquefied natural gas, and the other portion may be used as a line in which liquefied natural gas is vaporized and then compressed to supply compressed natural gas.

As described above, the LNG fueling station according to the present invention is basically characterized in that: the LNG tank containers T is transported to the installation part 110 and installed then on the installation part 110; and the LNG tank containers T supplies liquefied natural gas to the object for supply after installed on the installation part as the above while being installed on the installation part 110.

The LNG fueling station according to this example, due to this characteristic, may conveniently supply liquefied natural gas also to a place to which no pipe network is connected or a place to which a pipe network is hard to be connected. That is, when the LNG fueling station according to this example is installed at a place to which no pipe network is connected or a place to which a pipe network is hard to be connected, the liquefied natural gas may be conveniently supplied to such places by only transporting the LNG tank containers T to the installation part 110 and installing the LNG tank containers T on the installation part 110.

Also, since the LNG fueling station according to this example uses an LNG tank container T which may be installed while liquefied natural gas is stored therein, the LNG tank container T may be used as a storage apparatus, and thus a fixed storage tank is not required to be separately installed as a storage apparatus. For example, the LNG fueling station according to this example uses an LNG tank container T manufactured to have a predetermined specification according to related provisions such as International Organization for Standard (ISO) tank container, but since such an LNG tank container may be directly used as a storage apparatus, it is unnecessary to separately install a fixed storage tank as in the typical arts. (It is sufficient to install an LNG tank container on the installation part.)

Moreover, since the LNG fueling station according to this example does not fuel liquefied natural gas to a storage apparatus by means of a tank lorry, there is no loss or danger caused by the fueling. That is, contrary to a typical tank lorry which only simply transports liquefied natural gas to a consumer place, the LNG tank container T according to this example transports liquefied natural gas to a consumer place and is also installed on an installation part 110 located in the consumer place to take part in the supply of the liquefied gas. Therefore, there is no loss or danger caused by the fueling as in typical arts.

Also, when the above-mentioned LNG fueling station is used, the liquefied gas may be more conveniently and safely supplied to an object for supply. That is, first, the LNG tank container T is transported through a transporting means V to the installation part 110 on which the LNG tank container T is installed. Then, the LNG tank container T is unloaded from the transporting means V to the installation part 110 and installed on the installation part 110. Finally, the liquefied natural gas is supplied from the LNG tank container T installed at the installation part 110 to the object for supply, and thus the liquefied gas may be more conveniently and safely supplied to an object for supply.

EXAMPLE 2

Figure 3:
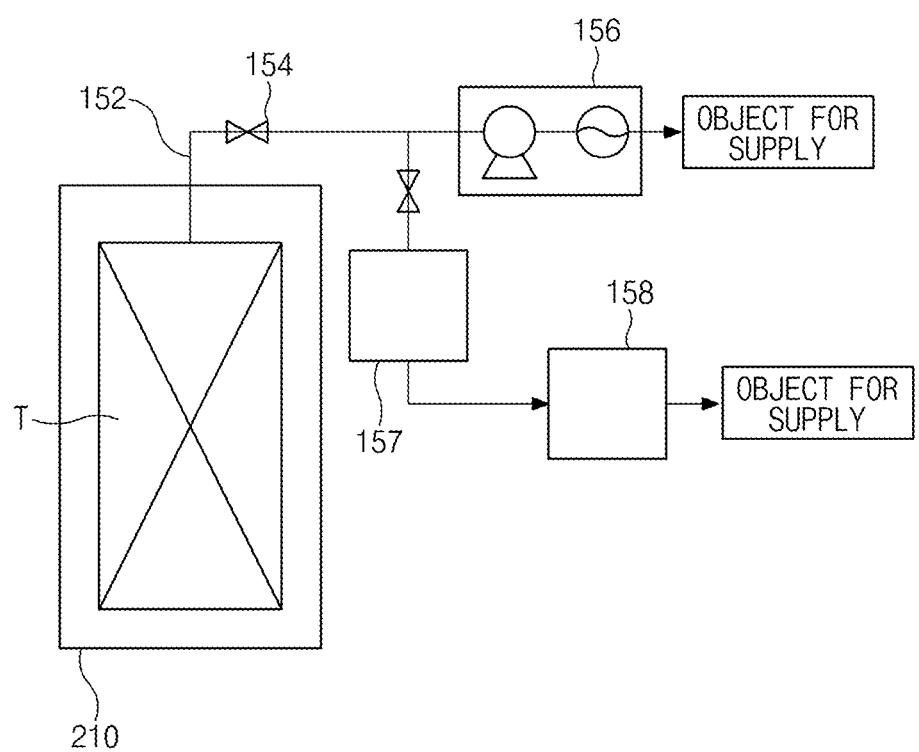
FIG. 3 is a conceptual diagram conceptually illustrating an LNG fueling station according to example 2 of the present invention.
Figure 4:
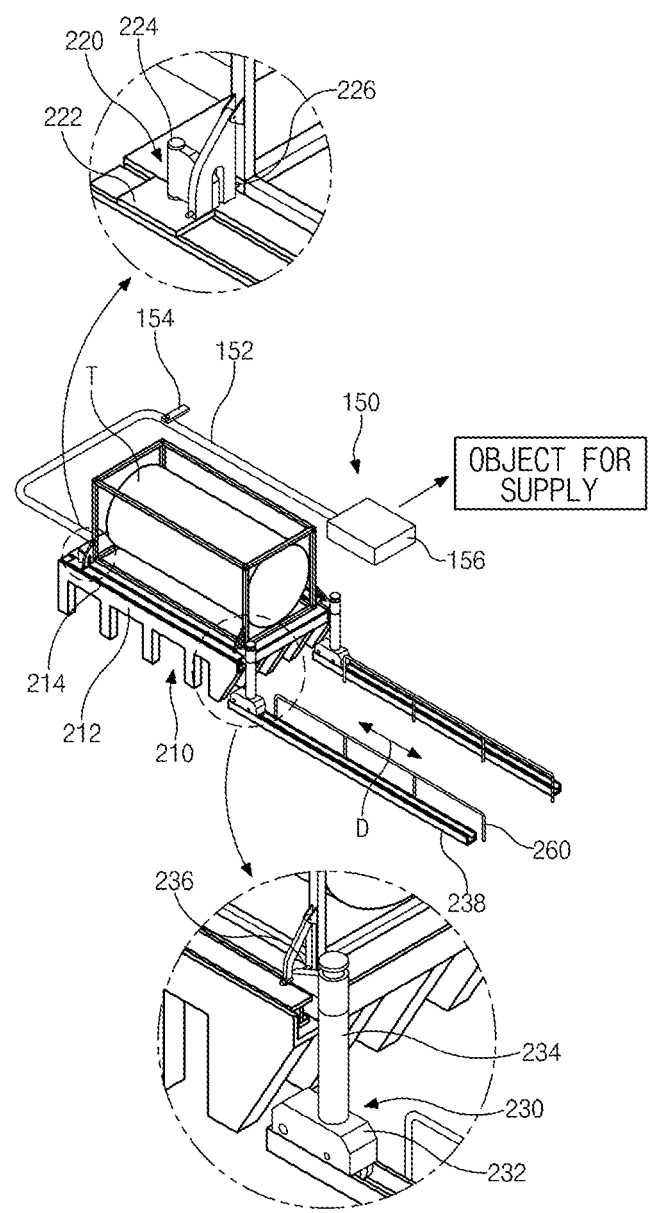
FIG. 4 is a perspective view specifically illustrating the LNG fueling station of FIG. 3.

FIG. 3 is a conceptual diagram conceptually illustrating an LNG fueling station according to example 2 of the present invention, and FIG. 4 is a perspective view specifically illustrating the LNG fueling station of FIG. 3. For reference, components which are the same as or equivalent to the above-mentioned components will be given the same or equivalent reference numerals, and thus detailed descriptions thereof will not be provided herein.

An LNG fueling station according to this example is basically characterized in that an LNG tank container T is unloaded through a sliding-type method. That is, in the LNG fueling station according to this example, the LNG tank container T is unloaded by pulling the LNG tank container T from a transporting means V to an installation part 210, or is loaded by pushing the LNG tank container T from the installation part 210 to the transporting means V. More specifically, as illustrated in FIG. 3, the LNG fueling station according to this example is basically characterized in that: the LNG tank containers T is unloaded from the transporting means V to the installation part 210 through a sliding-type method; and liquefied natural gas (see a fueling part with a reference number 156) is directly supplied from the LNG tank containers T to the object for supply through a supply part 220 installed on the installation part 210, or compressed natural gas (see a vaporizer with a reference number 157 and a compressor with a reference number 158) is supplied.

Hereinafter, a configuration for implementing such a sliding-type method will be described with reference to FIG. 4.

An LNG fueling station according to this example includes a movable part 220 to unload the LNG tank container T through a sliding-type method. The movable part 220 reciprocates in a direction D in which the LNG tank container T is unloaded from a transporting means V. Also, the movable part 220 is detachably fixed to the LNG tank container T and moves together with the LNG tank container T. Through this, the movable part 220 may move the LNG tank container T loaded on the transporting means V to an installation part 210 and move the LNG tank container T loaded on the installation part 210 to the transporting means V.

In this example, the installation part 210 includes a base 212 which is mounted on the ground and on which the LNG tank container T is loaded, and a guide 214 which is provided on the base 212 and guides the movable part 220 in the above-mentioned direction D. Here, the guide 214 may be a kind of groove as illustrated in FIG. 4. That is, the guide 214 may be a kind of groove by which the movable part 220 is guided by being inserted thereinto.

More specifically, the movable part 220 may include a movable base 222 and a movable lifter 224 provided on the movable base 222. The movable part 220 is movably installed on the installation part 210 and reciprocates in the above-mentioned direction D along the guide 214. Also, the movable lifter 224 is detachably fixed to the LNG tank container T and lifts the LNG tank container T. Accordingly, the LNG tank container T may be moved, while being lifted by the movable lifter 224, in the above-mentioned direction D by the movable base 222. As such, when the LNG tank container T is moved while being lifted, the LNG tank container T may be more easily moved through a sliding-type method. For reference, the movable lifter 224 may be implemented as a hydraulic apparatus. A support lifter 234 to be described later is the same as the movable lifter.

The LNG fueling station according to this example may further include a support part 230 in addition to the movable part 220. The support part 230 is detachably fixed to the LNG tank container T and moves together with the movable part 220 outside the installation part 210 while supporting the LNG tank container T. In comparison with moving the LNG tank container T only by the movable part 220, it is safer to move the LNG tank container T while supporting the LNG tank container T by the movable part 220 and the support part 230 together. More specifically, as illustrated in FIG. 4, the movable part 220 is fixed to an end of one side of the LNG tank container T to move the LNG tank container T inside the installation part 210. It is more preferable in light of weight distribution that the support part 230 be fixed to an end of the other side of the LNG tank container T to move the LNG tank container T outside the installation part 210 together with the movable part 220.

This support part 230 may include a support base 232 which moves together with the movable part 220 outside the installation part 210 (via the LNG tank container), and a support lifter 234 which is provided on the support base 232 and is detachably fixed to the LNG tank container T to lift the LNG tank container T. Through such a configuration, the LNG tank container T may be lifted by both the movable part 220 and the support part 230, and the LNG tank container T may be more stably moved by moving the LNG tank container T while being lifted by both.

In this example, the LNG tank container T is basically moved by the movable part 220. Contrary to this, it is sufficient for the support part 230 to support the LNG tank container T. That is, it is sufficient for the support part 230 to be moved by the movable part 220 while supporting the LNG tank container T. Accordingly, the movable part 220 is required to include a driving means such as a motor, but the support part 230 does not necessarily include a driving means. However, if necessary, the support part 230 may also include a driving means and may move the LNG tank container T by itself.

Figure 5:
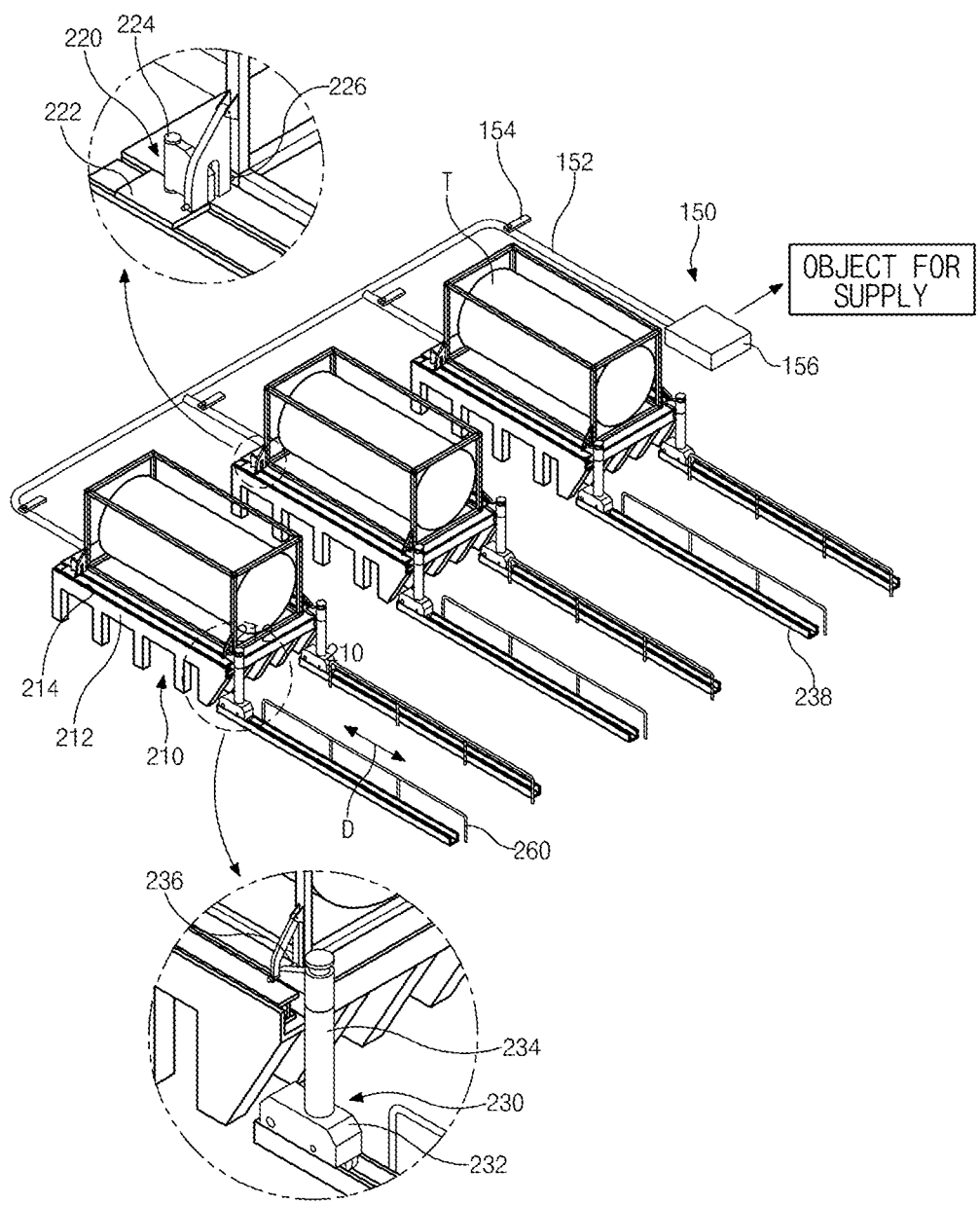
FIG. 5 is a perspective view illustrating a first modified example of the LNG fueling station of FIG. 4.

In this example, the supply capacity of liquefied natural gas may be adjusted through the number of the installation parts 210. For example, as illustrated in FIG. 5, the supply capacity of liquefied natural gas may be increased by installing the installation part 210 in plurality and installing the LNG tank container T for each installation part 210. As such, when the LNG tank container T is installed in plurality, each of the LNG tank containers T may be connected to one another through a pipe 152.

Figure 6:
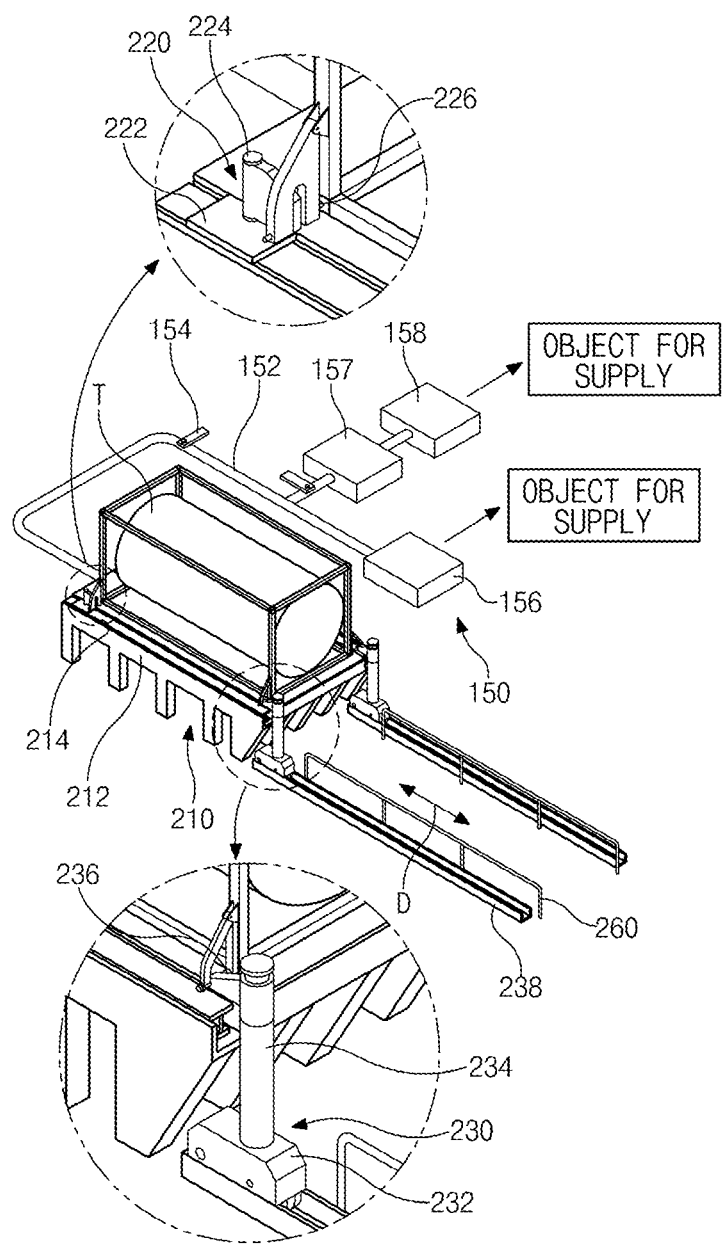
FIG. 6 is a perspective view illustrating a second modified example of the LNG fueling station of FIG. 4.

In this example, it is the same as the above-mentioned example that the supply part 150 includes a main pipe 152, a main valve 154, and a fueling part 156, and is capable of supplying liquefied natural gas to an object for supply. Also, as illustrated in FIG. 6, it is the same as the above-mentioned example that the supply part 150 further includes a vaporizer 157 and a compressor 158 and is capable of supplying compressed natural gas to an object for supply.

Figure 7:
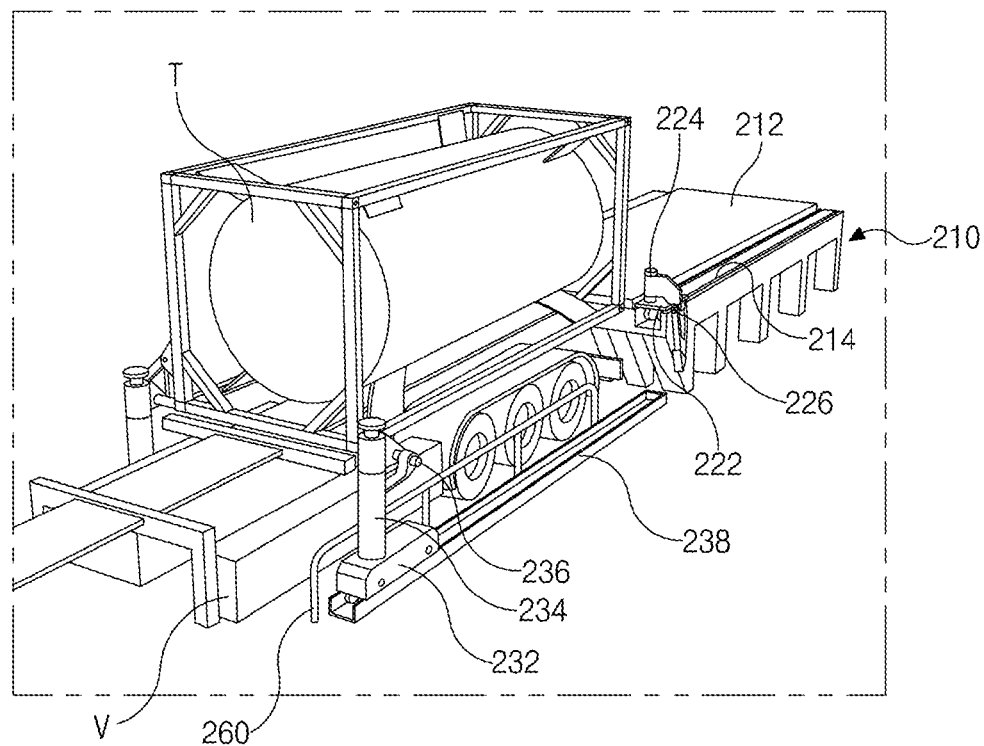
FIGS. 7 to 10 are perspective views for illustrating an operation of the LNG fueling station of FIG. 4 in detail.

Hereinafter, operations of an LNG fueling station according to this example will be described in more detail with reference to FIGS. 7 to 10. First, an LNG tank container T is transported to an installation part 210 located at a consumer place through a transporting means V such as a trailer truck. Then, as illustrated in FIG. 7, the trailer truck V is backed to the installation part 210. Here, the backward movement of the trailer truck V may be guided by a transporting means guide 260.

Figure 8:
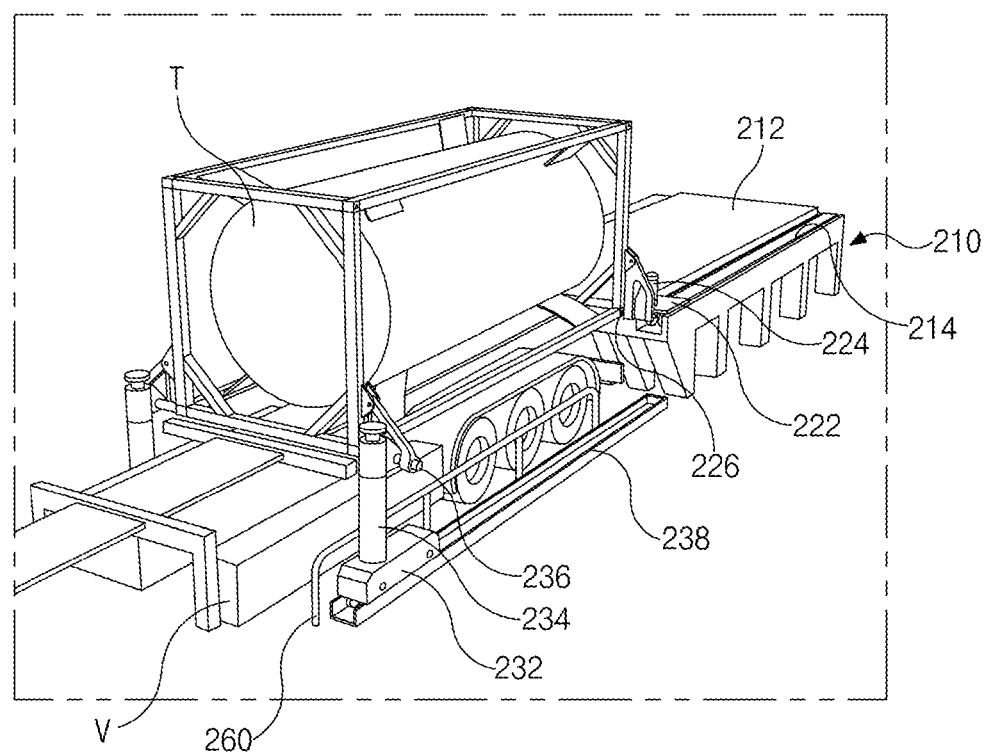

Then, as illustrated in FIG. 8, a movable part 220 is fixed to the rear side of the LNG tank container T, and a support part 230 is fixed to the front side of the LNG tank container T. In this fixation, holes formed in the LNG tank container T are used. More specifically, in general, predetermined holes for the fixation are previously formed in the LNG tank container T. In the LNG fueling station according to this example, the movable part 220 and the support part 230 are fixed to the LNG tank container T in such a way that a pin 226 provided in a lifter 224 of the movable part 220 and a pin 236 provided in a lifter 234 of the support part 230 are respectively inserted into holes of the LNG tank container T.

Figure 9:
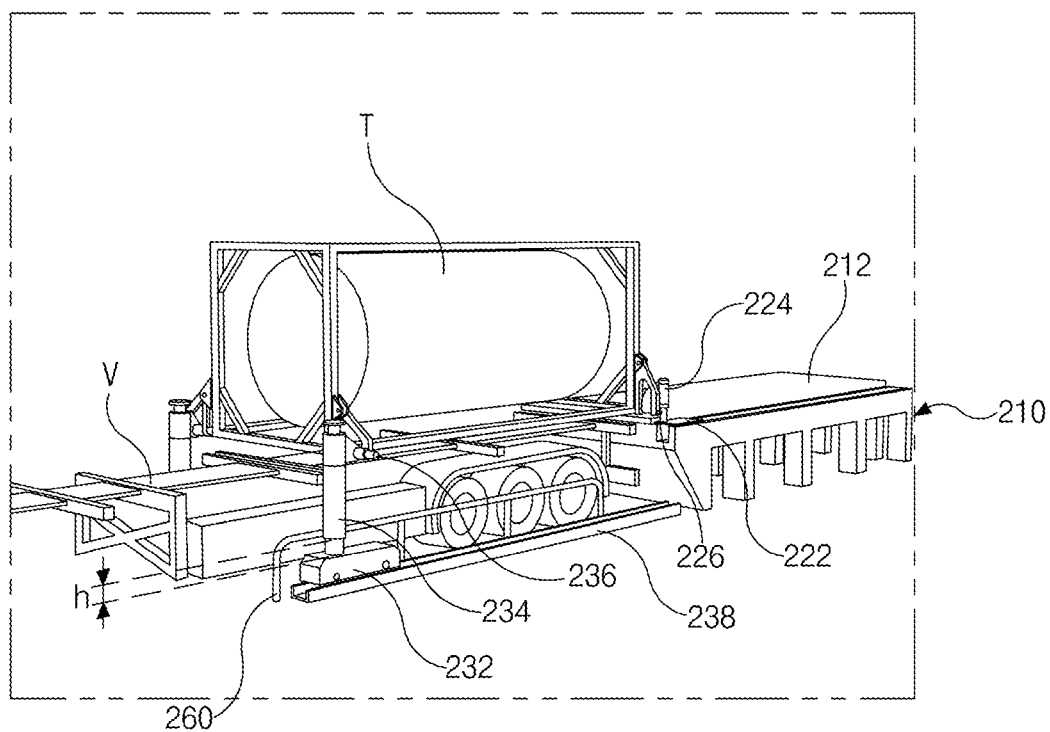
Figure 10:
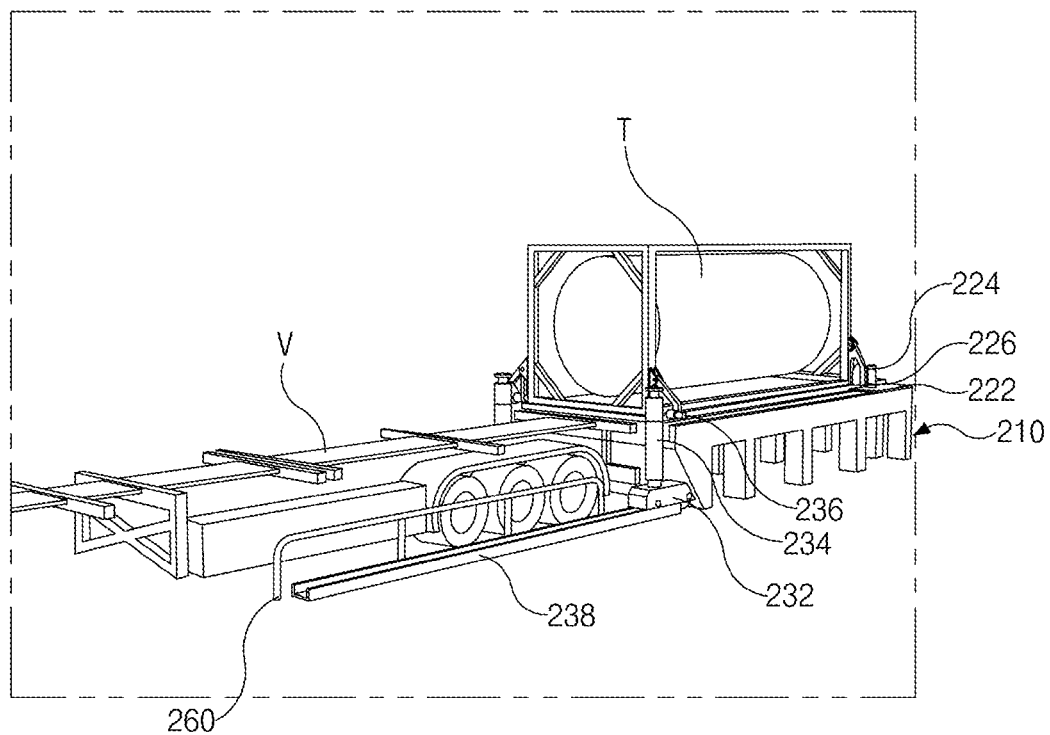

Then, as illustrated in FIG. 9, the lifter 224 of the movable part 220 and the lifter 234 of the support part 230 are driven to lift the LNG tank container T by a predetermined height h. Then, the LNG tank container T is pulled by a base 222 of the movable part 220 and is installed on a base 212 of the installation part 210 as illustrated in FIG. 10.

More specifically, the LNG tank container T is pulled to the base 212 of the installation part 210, and then the lifter 224 of the movable part 220 and the lifter 234 of the support part 230 are driven to mount the LNG tank container T on the base 212 of the installation part 210. Here, the movement of the base 222 of the movable part 220 is guided by a guide 214 of the installation part 210, and the movement of the base 232 of the support part 230 is guided by a support part guide 238.

Then, the LNG tank container T is connected to a fueling part 156 through a pipe 152. (The fueling part may be integrally provided with the installation part.) Then, according to a consumer request, liquefied natural gas is supplied from the LNG tank container T to an object for supply through the fueling part 156 after opening a main valve 154. Finally, when the liquefied natural gas in the LNG tank container T is exhausted, the LNG tank container T is loaded from the installation part 210 to the transporting means V through a reverse process to the above-described process. The liquefied natural gas may be continuously supplied to the object for supply by repeating the above processes of unloading and loading.

EXAMPLE 3

Figure 11:
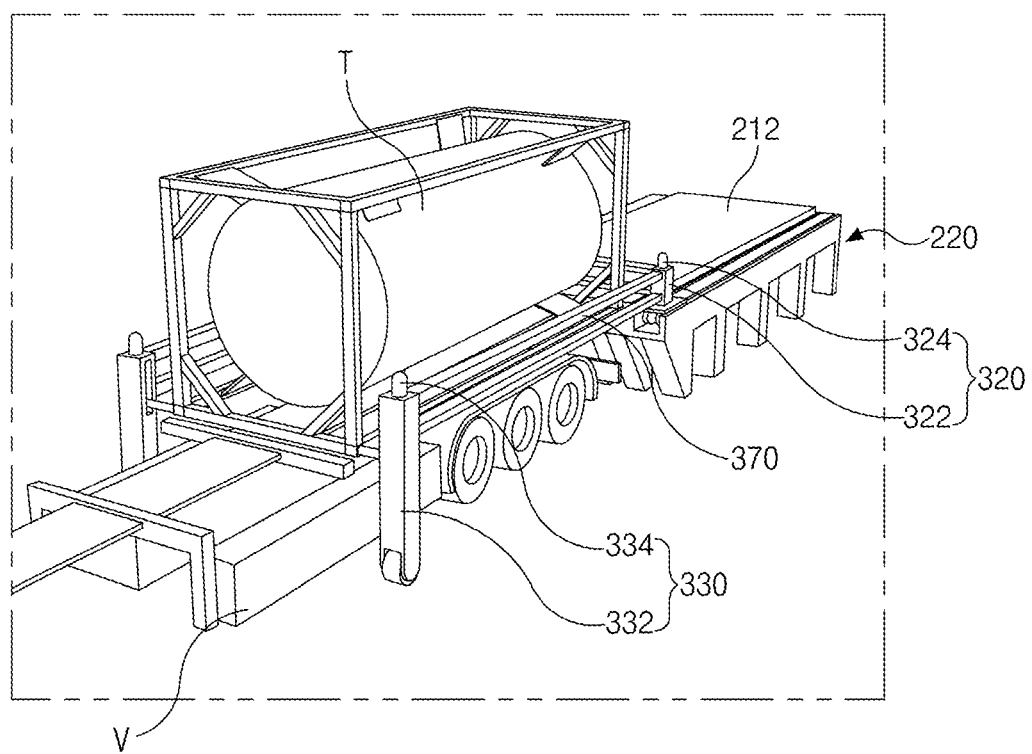
FIG. 11 is a perspective view illustrating an LNG fueling station according to example 3 of the present invention.

FIG. 11 is a perspective view illustrating an LNG fueling station according to example 3 of the present invention. For reference, components which are the same as or equivalent to the above-mentioned components will be given the same or equivalent reference numerals, and thus detailed descriptions thereof will not be provided herein.

An LNG fueling station according to this example is also provided with a movable part 320 and a support part 330. More specifically, the movable part 320 includes a base 322 and a lifter 324 and the support part 330 also includes a base 332 and a lifter 334. Here, the movable part 320 and the support part 330 are connected through a connection part 370. The movable part 320 and the support part 330 may be more stably moved by being connected as such.

The present invention relates to an LNG fueling station and an LNG fueling method capable of more conveniently and safely supplying liquefied natural gas, and is applicable to the industry.

The invention claimed is:

1. A liquefied natural gas (LNG) fueling station, comprising:
an installation part comprising:
a base mounted on a ground in order to receive an LNG tank container; and
a first pair of linear grooves formed on the base, and a second pair of linear grooves formed on the ground, a direction along the first and second pairs of linear grooves oriented parallel to each other;
a supply part configured to supply liquefied natural gas from the LNG tank container received on the installation part to an object; and
a loading and unloading assembly configured to load or unload the LNG tank container from a transporting equipment by moving together with the LNG tank container between the installation part and the transporting equipment,
wherein the loading and unloading assembly comprises:
a movable part guided by the first pair of linear grooves to reciprocate linearly on the installation part in a first direction or a second direction between a front end and a rear end of the installation part, and
a support part guided by the second pair of linear grooves and connected to the movable part through a connection structure to move together with the movable part, wherein the support part engages the LNG tank container to provide support to the LNG tank container during the loading and the unloading of the LNG tank container,
wherein the loading and unloading assembly enables the LNG tank container to move in the first direction when the LNG tank container is unloaded from the transporting equipment and in the second direction when the LNG tank container is loaded to the transporting equipment, by moving together with the LNG tank container in the first direction or second direction, respectively, and
wherein the liquefied natural gas is supplied to the object at a consumer site after completing installing the LNG tank container on the installation part through the loading and unloading assembly and transferring the liquefied natural gas to the object at the consumer site through the supply part.

2. The LNG fueling station of claim 1, wherein the movable part is movably provided in the installation part and is detachably fixed to the LNG tank container.

3. The LNG fueling station of claim 2, wherein the movable part comprises:
a movable base movably installed on the installation part; and a movable lifter configured to lift the LNG tank container, the movable lifter being provided on the movable base and detachably fixed to the LNG tank container.

4. The LNG fueling station of claim 2, wherein the support part is detachably fixed to the LNG tank container, and configured to move together with the movable part at the outside of the installation part while supporting the LNG tank container.

5. The LNG fueling station of claim 4, wherein the support part comprises:
   a support base configured to move together with the movable part at the outside of the installation part; and
   a support lifter configured to lift the LNG tank container, the support lifter being provided on the support base and detachably fixed to the LNG tank container.

6. The LNG fueling station of claim 4, wherein:
   the movable part is fixed to an end of one side of the LNG tank container to move the LNG tank container inside the installation part; and
   the support part is fixed to an end of the other side of the LNG tank container to move the LNG tank container together with the movable part at the outside of the installation part.

7. The LNG fueling station of claim 1, wherein the supply part comprises:
   a main pipe connected to the LNG tank container;
   a main valve provided in the main pipe and opening/closing the main pipe; and
   a fueling part connected to the main pipe to fuel the liquefied natural gas to the object for supply.

8. The LNG fueling station of claim 7, wherein the supply part further comprises:
   a vaporizer configured to receive the liquefied natural gas from the LNG tank container and vaporize the liquefied natural gas to generate natural gas; and
   a compressor configured to receive natural gas from the vaporizer and compress the natural gas to generate compressed natural gas (CNG).

9. A liquefied natural gas (LNG) fueling station, comprising:
   an installation part comprising:
   a base mounted on a ground in order to receive an LNG tank container; and
   a first linear groove formed on the base, and a second linear groove mounted on a ground;
   a supply part configured to supply liquefied natural gas from the LNG tank container received on the installation part to an object; and
   a loading and unloading assembly configured to load or unload the LNG tank container from a transporting equipment by moving together with the LNG tank container between the installation part and the transporting equipment,
   wherein the loading and unloading assembly comprises:
      a movable part guided by the first linear groove formed on the base to reciprocate on the installation part in a first direction or a second direction between a front end and a rear end of the installation part;
      a support part guided by the second linear groove connected to the movable part through a connection structure to move together with the movable part, wherein the support part engages the LNG tank container to provide support to the LNG tank container during the loading and the unloading of the LNG tank container; and
      a motor part configured to move the movable part during the loading and the unloading of the LNG tank container,
   wherein the loading and unloading assembly enables the LNG tank container to move in the first direction when the LNG tank container is unloaded from the transporting equipment and in the second direction when the LNG tank container is loaded to the transporting equipment, by moving together with the LNG tank container in the first direction or second direction, respectively, and
   wherein the liquefied natural gas is supplied to the object at a consumer site after completing installing the LNG tank container on the installation part through the loading and unloading assembly and transferring the liquefied natural gas to the object at the consumer site through the supply part.

10. The LNG fueling station of claim 9, wherein each of the first linear groove and the second linear groove is a pair of parallel groves.

* * * * *